United States Patent [19]

Okuzumi

[11] Patent Number: 5,007,303
[45] Date of Patent: Apr. 16, 1991

[54] VARIABLE INERTIAL MASS FLYWHEEL

[75] Inventor: Hiroshi Okuzumi, Yokosuka, Japan

[73] Assignee: Nissan Motor Co., Ltd., Yokohama, Japan

[21] Appl. No.: 337,488

[22] Filed: Apr. 13, 1989

[30] Foreign Application Priority Data

Apr. 13, 1988 [JP] Japan ................... 63-92300

[51] Int. Cl.⁵ ............... F16F 15/10; F16F 15/18; F16D 27/00
[52] U.S. Cl. ................. 74/573 F; 74/573 R; 74/572; 192/21.5; 192/35; 188/267; 464/29
[58] Field of Search ............. 74/572, 573 R, 573 F; 192/21.5, 35; 188/378, 267; 464/29

[56] References Cited

U.S. PATENT DOCUMENTS

| | | | |
|---|---|---|---|
| 2,575,360 | 11/1951 | Rabinow | 192/21.5 |
| 2,684,138 | 7/1954 | Buckman | 192/21.5 |
| 2,886,151 | 5/1959 | Winslow | 192/21.5 |
| 3,047,507 | 7/1962 | Winslow | 252/75 |
| 3,691,413 | 9/1972 | Russell | 74/572 |
| 4,664,236 | 5/1987 | Stangroom | 192/35 |
| 4,815,674 | 3/1989 | Blake et al. | 188/267 X |
| 4,861,006 | 8/1989 | Takano et al. | 188/267 X |
| 4,873,888 | 10/1989 | Matsuyama | 74/573 F |
| 4,896,754 | 1/1990 | Carlson et al. | 192/21.5 |

FOREIGN PATENT DOCUMENTS

58-30053  2/1983  Japan .
60-104828  6/1985  Japan .

*Primary Examiner*—Allan D. Herrmann
*Assistant Examiner*—Winnie Yip
*Attorney, Agent, or Firm*—Foley & Lardner

[57] ABSTRACT

In a variable inertial mass flywheel having a main flywheel member coupled to an engine crankshaft and a subflywheel member rotatably arranged relative to the main flywheel member, an electrorheological fluid whose viscosity changes according to intensity of electric field at high response speed is enclosed between electrodes formed on the main flywheel member and the subflywheel member. At engine idling, a higher voltage is applied to the electrodes to increase the viscosity of the fluid, that is, to increase inertial mass of the flywheel so that engine torque ripple can effectively be absorbed. At engine acceleration, a lower (or zero) voltages is applied to the electrodes to decrease the viscosity of the fluid, that is to decrease inertial mass of the flywheel so that high engine torque response characteristics can stably be obtained.

5 Claims, 11 Drawing Sheets

FIG.17(A)
NO VOLTAGE

FIG.17(B)
LOW VOLTAGE

FIG.17(C)
HIGH VOLTAGE

FIG.17(D)
UNDER SHEAR

VARIABLE INERTIAL MASS FLYWHEEL

BACKGROUND OF THE INVENTION

1. Field of the Invention

The present invention relates to a variable inertial mass flywheel whose inertial mass can be varied according to fluctuations of engine speed, and more specifically to a variable inertial mass flywheel whose response characteristics to engine speed fluctuations can be improved markedly.

2. Description of the Prior Art

In general, when the inertial mass of a flywheel is determined large, the flywheel can effectively absorb fluctuations of engine torque (referred to as torque ripple, hereinafter). On the other hand, however, the engine torque response characteristics of the flywheel is degraded in particular when an engine is accelerated. To overcome the above-mentioned problems, variable inertial mass flywheels have been proposed such that the inertial mass is large when torque ripple is large (as when the engine is being idled at low speed) but small when higher engine torque response characteristics are required (as when the engine is being accelerated to high speed).

Figure 1:
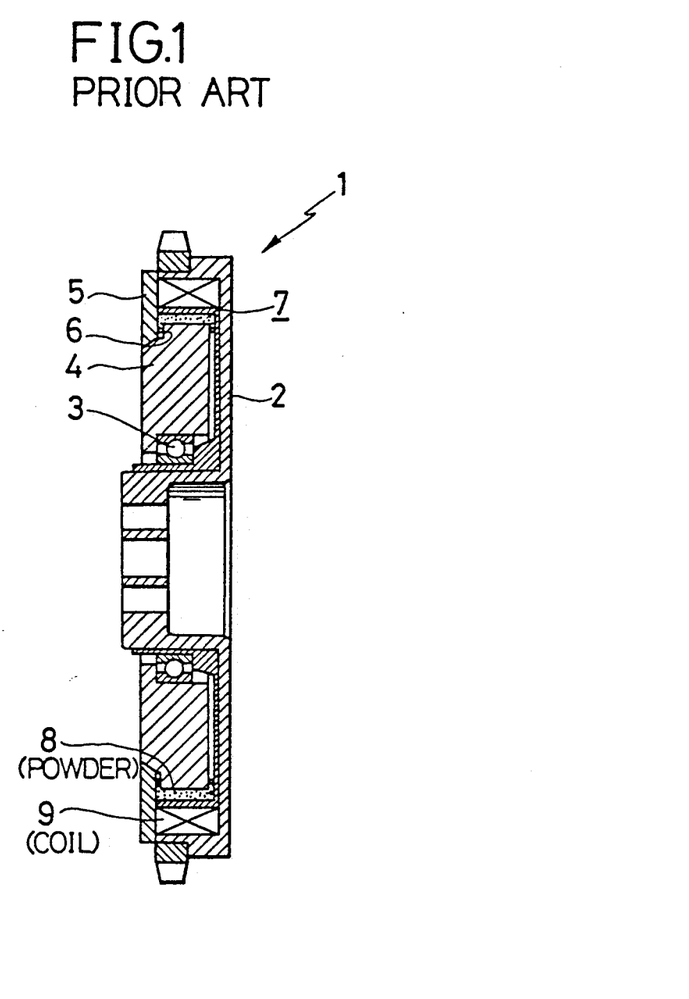
FIG. 1 a cross-sectional view showing an example of prior-art able inertial mass flywheel.

An example of the prior-art variable inertial mass flywheel is disclosed in Japanese Published Unexamined (Kokai) Utility Model Application No. 58-30053, for instance. FIG. 1 shows this prior-art variable inertial mass flywheel 1, in which a main flywheel member 2 connected to an engine crankshaft (not shown) is rotated by an engine (not shown).

A subflywheel member 4 is rotatably attached to the main flywheel member 2 via a bearing 3. When the engine is rotating at low speed (e.g. being idled), the subflywheel member 4 is coupled to the main flywheel member 2 to increase the inertial mass, that is, to effectively absorb engine torque ripple. On the other hand, when the engine is rotating at high speed (e.g. being accelerated), the subflywheel member 4 is decoupled from the main flywheel member 2 to decrease the inertial mass, that is, to improve the engine torque response characteristics. In this case, the subflywheel member 4 is coupled to or decoupled from the main flywheel member 2 by magnetizing or demagnetizing electromagnetic powder 8 with an electromagnetic coil 9 in order to change frictional force in the electromagnetic powder 8. The electromagnetic powder 8 and the coil 9 are enclosed within an elctromagnetic chamber 7 formed by the inner circumferential surface of the main flywheel member 2, the outer circumferential surface of the subflywheel member 4, the inner surface of a cover member 5, and a seal member 6. The electromagnetic coil 9 is energized by a voltage supplied from a power supply (not shown). In more detail, when engine torque ripple exceeds a reference level, the electromagnetic coil 9 is energized to increase the inertial mass of the flywheel 1.

In the above-mentioned prior-art variable inertial mass flywheel, however, since the inertial mass is varied by magnetizing or demagnetizing electromagnetic powder 8 enclosed between the main flywheel member 2 and the subflywheel member 4, there exists a problem in that charge in frictional force of the electromagnetic powder 8 caused by electromagnetic magnetization and demagnetization is not large and not stable, and therefore the response characteristics of inertial mass to engine speed fluctuations is low, so that it is impossible to stably obtain sufficient change in inertial mass of the flywheel.

In more detail, even if the electromagnetic powder 8 is magnetized, the density of the electromagnetic powder 8 only near the electromagnetic coil 9 is increased and therefore it is difficult to sufficiently increase the frictional force uniformly in the powder 8. In addition, since the two opposing areas of the inner circumferential surface of the main flywheel member 2 and the outer circumferential surface of the subflywheel member 4 are not broad, the frictional force is not sufficiently large and therefore the two flywheel members 2 and 4 are not coupled tightly, so that it is difficult to sufficiently change the inertial mass.

SUMMARY OF THE INVENTION

With these problems in mind, therefore, it is the primary object of the present invention to provide a variable inertial mass flywheel which can change inertial mass sufficiently and stably at high response speed.

The basic concept of the present invention is to use a fluid (e.g. electrorheological fluid) whose viscosity changes at high response speed according to change in electric field strength applied to the fluid, in place of electromagnetic powder.

To achieve the above-mentioned object, the variable inertial mass flywheel connected to an engine via an engine output shaft, according to the present invention, comprises (a) a main flywheel member connected to the engine output shaft and rotatable therewith; (b) a subflywheel member disposed opposingly to said main flywheel member and rotatable relative to said main flywheel member; (c) at least one pair of electrodes formed on both opposing surfaces of said main flywheel member and said subflywheel member; (d) a power supply controller connected to said electrodes, for controllably generating electric field between said electrodes formed on said main flywheel member and said subflywheel member; and (e) a fluid disposed between said electrodes, viscosity of said fluid being varied according to intensity of electric field generated between said electrodes to controllably couple or decouple said subflywheel member to or from said main flywheel member via said fluid.

In the variable inertial mass flywheel according to the present invention, an electrorheological (ER) fluid is enclosed between two electrodes formed on the main flywheel member and the subflywheel member, and the viscosity of the ER fluid changes at high response speed according to change in intensity of electric field. Therefore, the subflywheel member can quickly be coupled to or decoupled from the main flywheel member. In practice, at engine idling, a higher voltage is applied to the flywheel to increase the viscosity of the ER fluid, that is, to couple the subflywheel member to the main flywheel member to increase the inertial mass thereof, so that engine torque fluctuations can be absorbed effectively. On the other hand, at engine acceleration, a lower (or zero) voltage is applied to the flywheel to decrease the viscosity of the ER fluid, that is, to decouple the subflywheel member from the main flywheel member to decrease the inertial mass thereof, so that engine torque response characteristics can be increased effectively.

BRIEF DESCRIPTION OF THE DRAWINGS

FIG. a cross-sectional view showing an embodiment of the variable inertial mass flywheel according to the present invention.

DETAILED DESCRIPTION OF PREFERRED EMBODIMENTS

An embodiment of the present invention will be described hereinbelow with reference to the attached drawings.

Figure 2:
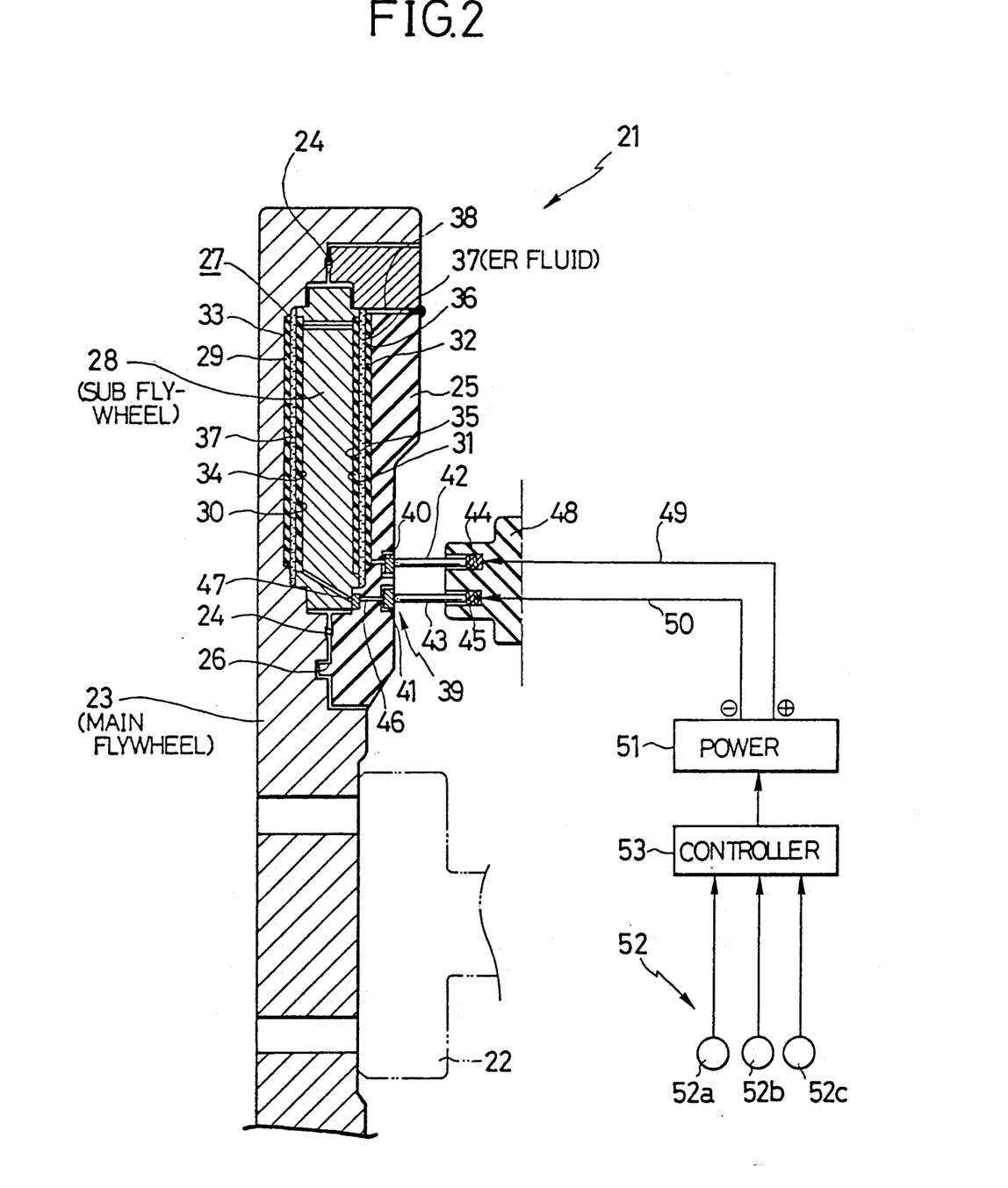

In FIG. 2, a variable inertial mass flywheel 21 of the present invention comprises a main disk-shaped flywheel member 23 connected to an engine crankshaft 22, an annular insulating cover member 25 attached to the main disk-shaped flywheel member 23 via two O-rings 24 and an annular locating projection 26, and an annular subflywheel 28 rotatably disposed within a fluid chamber 27 partitioned by the main flywheel member 23 and the cover member 25.

Four opposite surfaces between the main flywheel member 23 and the subflywheel member 28 and between the subflywheel member 28 and the cover member 25 are formed with four electrodes 33, 34 and 35, 36 covered by four insulating materials 29, 30 and 31, 32.

Further, two spaces enclosed by these four electrodes 33, 34 and 35, 36, respectively are filled with an electrorheological fluid 37 (referred to as ER fluid, hereinafter) whose viscosity changes according to electric field strength applied therebetween. This ER fluid 37 is poured through an charging hole 38 formed in the cover member 25. After the ER fluid 37 has been poured, this hole 38 is closed.

Further, a slip ring mechanism 39 is provided on the engine-side surface of the cover member 25. This slip ring mechanism 39 is composed of a pair of first and second concentric annular rail-shaped conductors 40 and 41, two first and second rod-shaped conductors 42 and 43 in slidable contact with the rail-shaped conductors 40 and 41, and two springs 44 and 45 for urging the rod conductors 42 and 43 against the rail-shaped conductors 40 and 41, respectively.

The rail-shaped conductor 40 is connected to the two main-flywheel electrodes 33 and 36 through wires (not shown), and the rail-shaped conductor 41 is connected to two subflywheel electrodes 34 and 35 via a third annular rail-shaped conductor 47 and a third rod-shaped conductor 46 in slidable contact with the annular conductor 47. The two rod conductors 42 and 43 and the springs 44 and 45 are inserted into a high voltage supply terminal 48 connected to a power supply 51 via two wires 49 and 50.

On the other hand, various sensors 52 for detecting engine operating conditions such as a throttle opening rate sensor 52a, an engine speed sensor 52b, a top dead center sensor 52c, etc. are connected to a controller 53 such as a microcomputer for calculating engine torque ripples on the basis of various sensor signals by executing a control program (described later) and for outputting a command signal to the power supply 51. The power supply 51 generates predetermined control voltages in response to the command signals, and applies the control voltages to the electrodes 33, 34 and 35, 36 via the wires 49 and 50 and the slip ring mechanism 39 composed of the three annular rail-shaped conductors 40, 41 and 47 and three rod-shaped conductors 42, 43 and 46.

The operation of the flywheel 21 will be described hereinbelow, when half(0.5)-degree vibration of a diesel engine can be reduced by this flywheel 21 by way of example.

Figure 3:
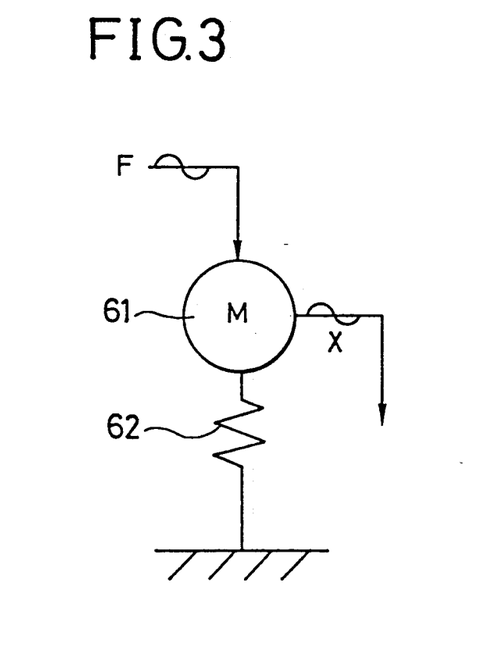
FIG. 3 is a model view showing one freedom vibration system of the variable inertial mass flywheel of the present invention.
Figure 4:
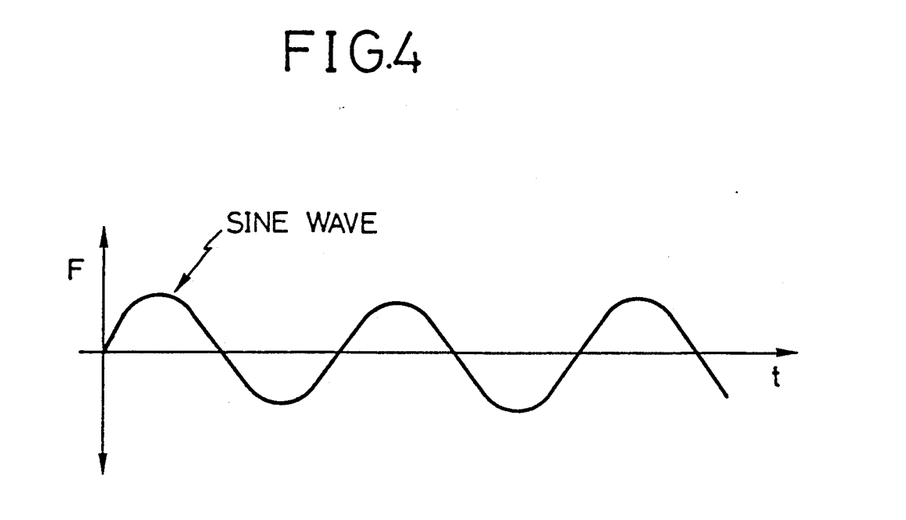
FIG. 4 is a graphical representation showing an input waveform.
Figure 5:
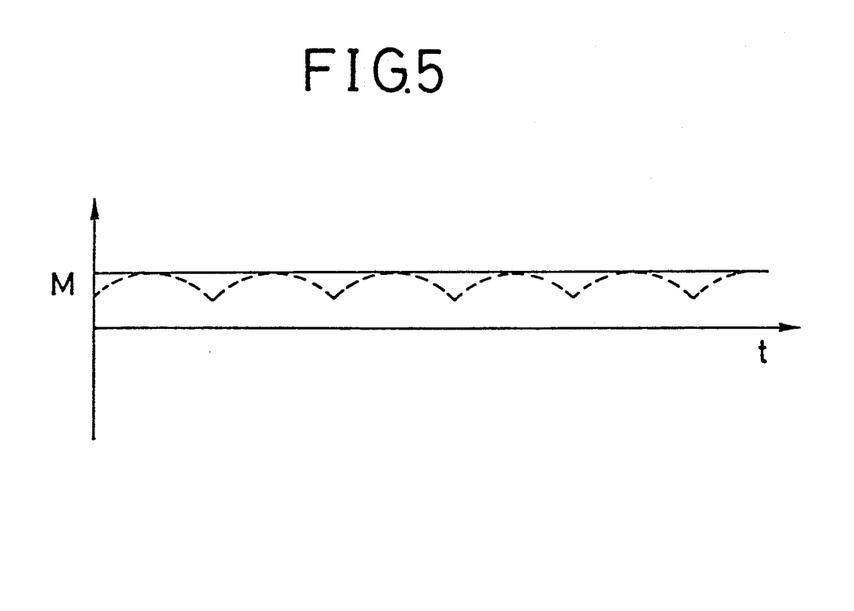
FIG. 5 a graphical representation showing change in mass with to time.
Figure 6:
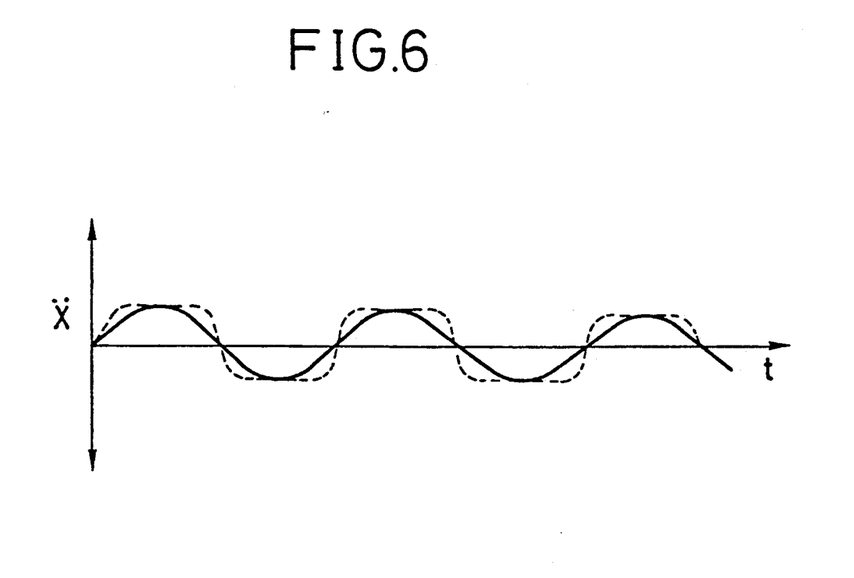
FIG. 6 graphical representation showing change in acceleration with respect to time.
Figure 7A:
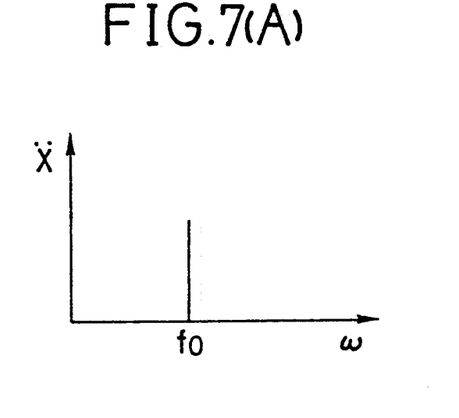
FIG. 7(A) is a graphical representation showing a spectrum of an acceleration obtained in response to a sine wave.
Figure 7B:
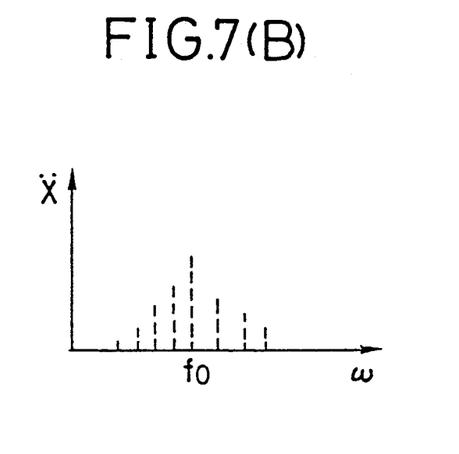
FIG. 7(B) is another graphical representation showing spectra of an acceleration obtained in response to a non-sine wave.

FIG. 3 shows a simplified one-degree vibration model vibrated by a sine wave external force F of frequency fo. In FIG. 3, a mass M at a load point 61 is supported by a spring 62, and vibrated by a sine wave external force F as shown in FIG. 4. Here, assumption is made that the mass M at the load point 61 is constant as shown by a solid line in FIG. 5. Under these conditions, the acceleration $\ddot{X}$ of the mass M changes in an accurate sine wave form as shown by a solid curve in FIG. 6, and therefore a unit spectrum at frequency fo as shown in FIG. 7(A) can be obtained. On the other hand, when the mass M at the load point 61 is varied (as when the variable inertial mass flywheel is rotated) as shown by a dashed curve in FIG. 5, the acceleration $\ddot{X}$ of the mass M changes in a trapezoidal wave form as shown by a dashed curve in FIG. 6, and therefore a wide spectrum distribution including a number of higher harmonics with the frequency fo as its basis can be obtained as shown in FIG. 7(B). In other words, it is possible to change the vibration frequency characteristics of the acceleration $\ddot{X}$ of the mass M by varying the mass M.

On the basis of the above-mentioned principle, in the present invention, an ER fluid 37 (described later) is filled between the main flywheel member 23 (including the cover member 25) and the subflywheel member 28, and the viscosity of this ER fluid 37 is controllably changed so that the subflywheel member 28 is coupled to or decoupled from the main flywheel member 23 including the cover member 25 in order to change the inertial mass of the flywheel 21. When the inertial mass can be varied, it is possible to change the vibration frequency characteristics of the diesel engine in the same way as in the one-freedom vibration model, in order to reduce the half-degree diesel engine vibration.

Figure 8:
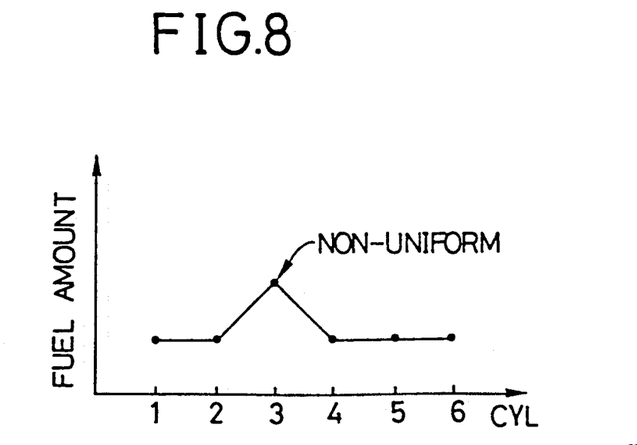
FIG. 8 is a graphical representation showing the non-uniform of fuel injected to an engine.
Figure 9:
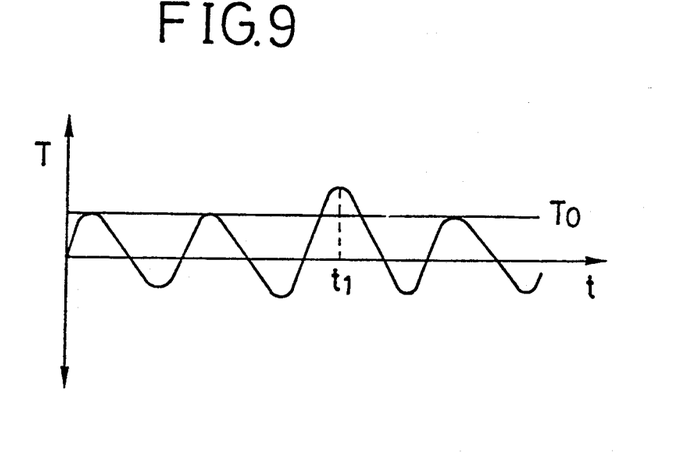
FIG. 9 is graphical representation showing change in engine respect to time.

In more detail, the half-degree diesel engine vibration is generated due to the fact that the amount of fuel supplied to each engine cylinder is not uniform as shown in FIG. 8 and therefore engine torque T of one cylinder increases abruptly at time $t_1$ beyond a uniform engine torque To of other cylinders as shown in FIG. 9. Under these conditions, when the inertial mass $I_p$ of the flywheel is determined constant as shown by a solid line in FIG. 10, since engine torque vibration including half-degree components is generated and further the frequency of the generated vibration matches the resonant frequency of the vehicle body in the rolling direction, the half-degree diesel engine vibration is amplified in the vehicle body as shown by a solid curve in FIG. 11. In the present invention, it is possible to reduce the half-degree diesel engine vibration by changing the vibration frequency of the engine system away from the resonant vehicle body frequency in the rolling direction by varying the inertial mass of the flywheel 21.

Figure 10:
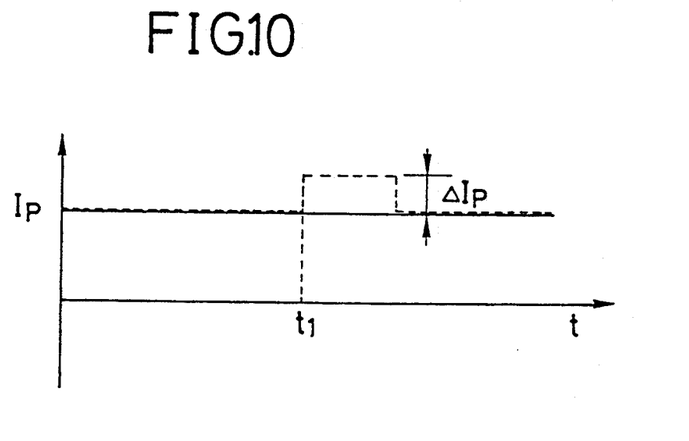
FIG. 10 is a graphical representation showing change in inertial ma with respect to time.
Figure 11:
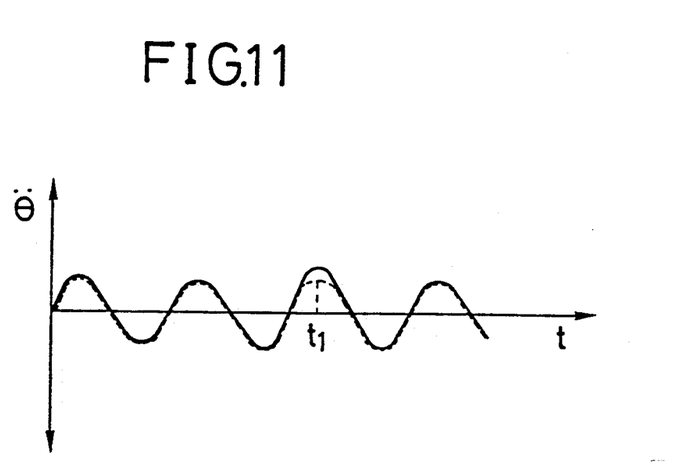
FIG. 11 is a graphical representation showing vibration (angular acceleration) with respect to time.

That is, when engine revolution fluctuates, the viscosity of the ER fluid 37 is increased to couple the subflywheel member 28 with the main flywheel member 23 and 25, so that the inertial mass $I_p$ is increased by $\Delta I_p$ as shown by dashed lines in FIG. 10 and therefore the vibration frequency of the engine system changes. As a result, the vibration frequency of the engine system is deviated away from the resonant frequency of the rolling direction vehicle body so that the half-degree diesel engine vibration can be suppressed. On the other hand, when the engine is operating at high speed, since the torque ripple is small and therefore no half-degree diesel engine vibration is generated, no voltage is applied from the power supply 51 to the electrodes 33, 34 and 35, 36. Therefore, since the ER fluid 37 is kept at substantially liquid or sol-gel state, the subflywheel member 28 is decoupled from the main flywheel member 23 and 25, so that the inertial mass of the flywheel is reduced to increase the engine torque response characteristics. In practice, there has been known a high response speed ER fluid 37 whose viscosity increases by seven times at such a short time period as several msec according to change in electric field strength applied to the ER fluid 37. The above-mentioned response speed is sufficiently high because time required for one engine revolution at 600 rpm engine speed is about 100 msec.

Figure 12:
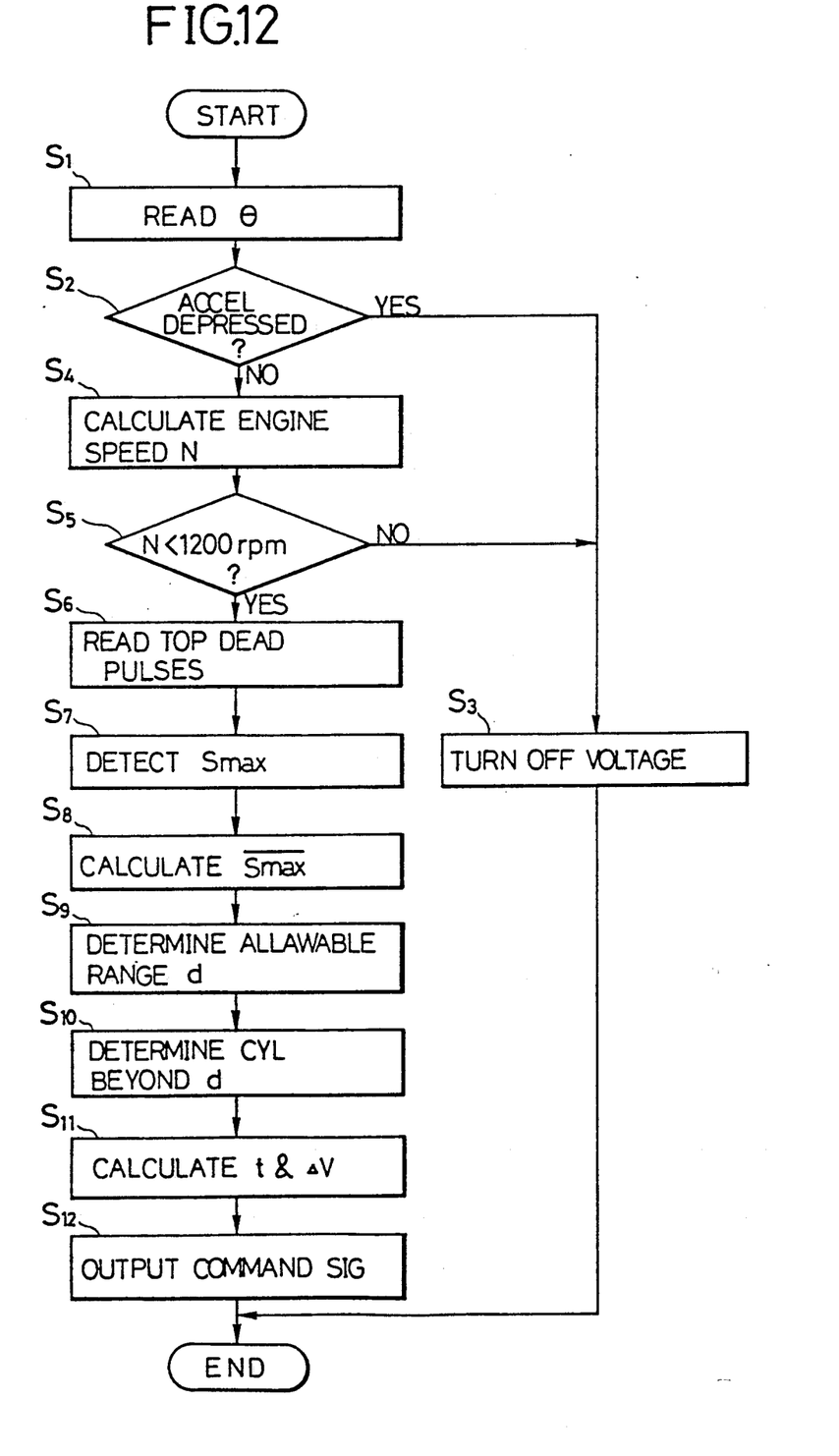
FIG. 12 is a flowchart showing a program for controlling applied to the flywheel.

The operation of the controller 53 will be described with reference to a flowchart shown in FIG. 12, which determines the magnitude and the timing of voltages applied to the electrodes 33, 34 to 35, 36.

When control starts, a CPU incorporated in the controller 53 first reads a throttle opening rate 8 from the throttle opening rate sensor 52a (in step S1) and checks whether an accelerator pedal is being depressed on the basis of the read throttle opening rate $\theta$ (in step S2). If the accelerator pedal is being depressed (YES), since no half(0.5)-degree diesel engine vibration will be generated, CPU proceeds to the succeeding step to turn off control voltage (in step S3), ending the current control.

On the other hand, if the accelerator pedal is not being depressed (NO), since half(0.5)-degree diesel engine vibration may be generated, CPU proceeds to the succeeding step to read pulse signals from the engine speed sensor 52a, that is, to calculate engine speed N on the basis of the pulse intervals of these read pulse sensor signals (in step S4). CPU checks whether the calculated engine speed N lies within a predetermined low speed range (e.g. less than 1200 rpm) in which the half-degree engine vibration is easily generated (in step S5). If $N \leq 1200$ rpm, since the half-degree engine vibration may not be generated, CPU proceeds to the succeeding step to turn off control voltage (in step S3), ending the current control.

Figure 13:
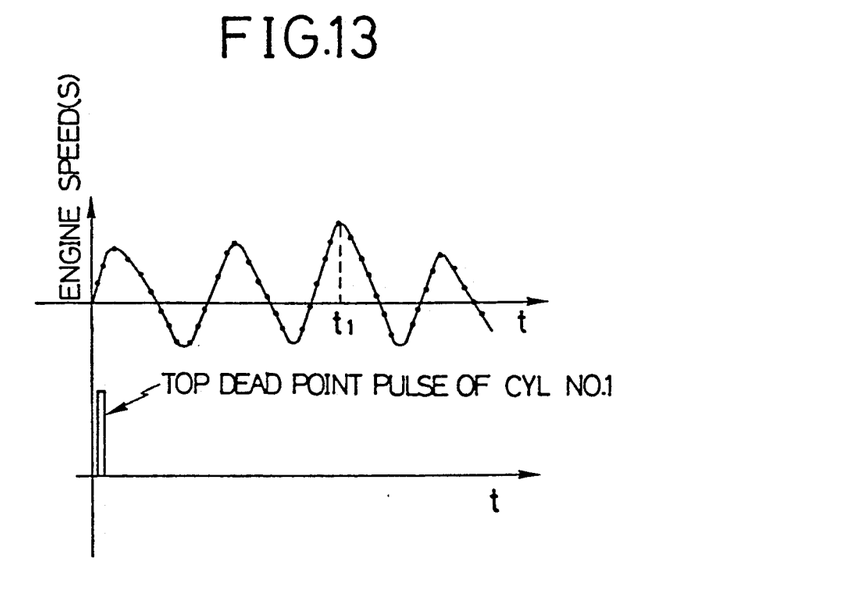
FIG. 13 is a graphical representation showing change in engine with respect to time.
Figure 14:
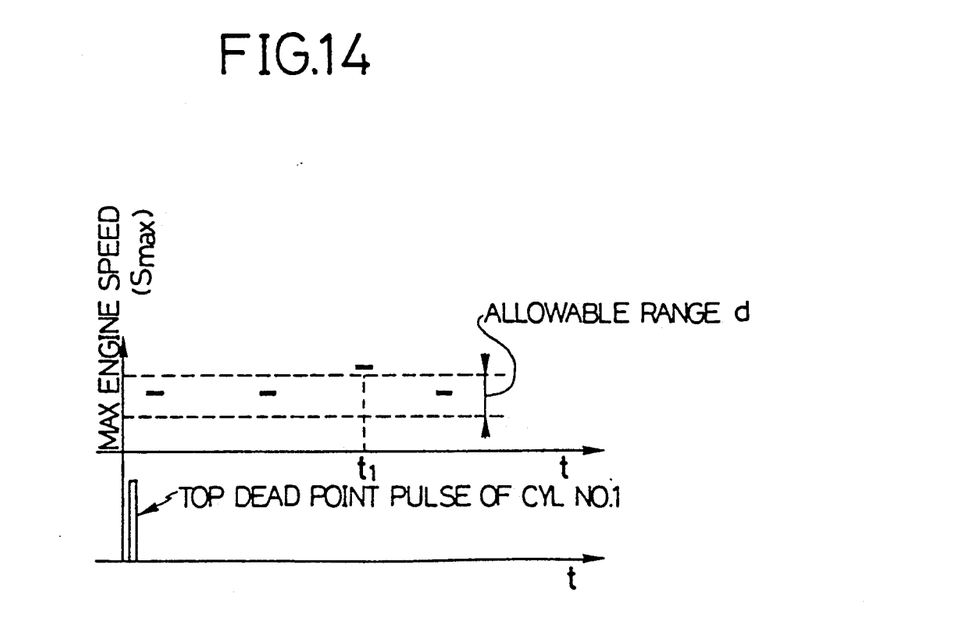
FIG. 14 is a graphical representation showing change in maximum speed with respect to time.
Figure 15:
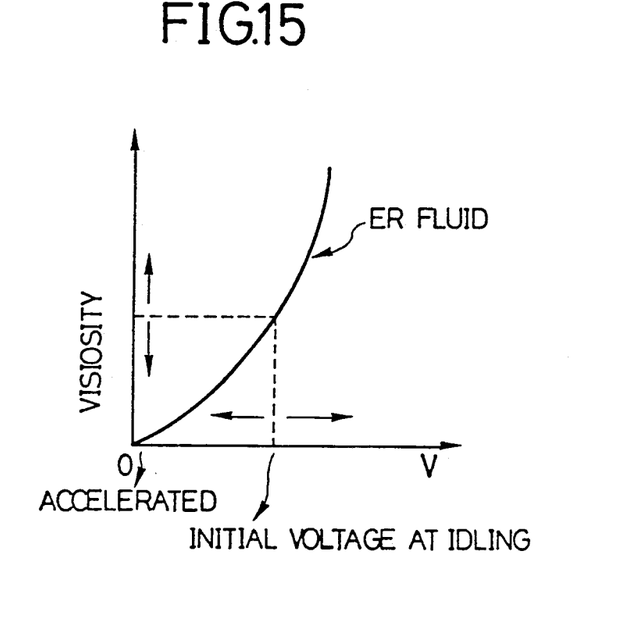
FIG. 15 is a graphical representation showing fluid characteristics of an electrorheological fluid.
Figure 16:
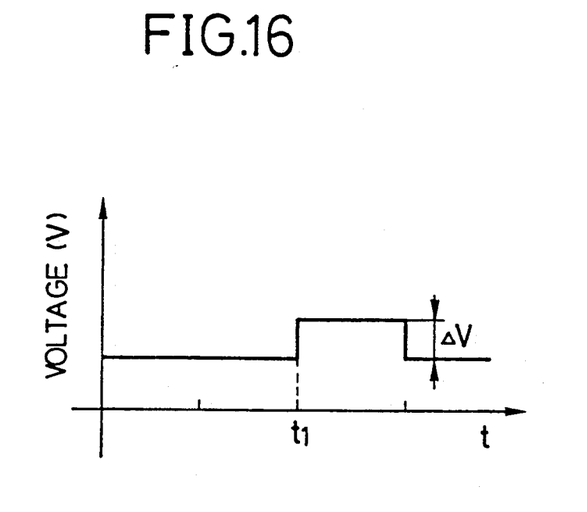
FIG. 16 is a graphical representation showing change in control voltage applied to the flywheel with respect to time.

On the other hand, if $N < 1200$ rpm; that is, the engine is operating at low speed as when being idled, CPU proceeds to the succeeding steps to determine the magnitude and the timing of voltages to be applied to the flywheel. In more detail, CPU reads pulse signals from the top dead point pulse sensor 52c to determine top dead points of a cylinder No. 1, for instance, on the basis of these pulse signals (in step S6), and detects the maximum engine speeds $S_{max}$ for each cycle on the basis of the read top dead point pulses of the cylinder No. 1 (in step S7). In this case, engine speed S changes as shown in FIG. 13, for instance. CPU calculates an average engine speed $\overline{S_{max}}$ of the maximum engine speeds $S_{max}$, and an allowable range d of the maximum engine speeds $S_{max}$ on the basis of the calculated average valve $\overline{S_{max}}$, mean valves within several cycles, a variance, a correction coefficient, etc. (in step S9). Once the above-mentioned allowable range d has been determined, CPU determines cylinders whose maximum engine speed $S_{max}$ lies out of the allowable range d on the basis of the top dead point pulses (in step S10). When the maximum engine speed $S_{max}$ increases beyond the allowable range d at time $t_1$ as shown in FIG. 14, for instance, since there exists a danger that the half-degree diesel engine vibration may be generated, CPU determines the magnitude and the timing of the voltage to be applied to the flywheel on the basis of the maximum engine speed $S_{max}$ at $t_1 = t$ as shown in FIG. 14 and the ER fluid viscosity-voltage characteristic curve as shown in FIG. 15 (in step S11). In more detail, during diesel engine idling, a deviation of the maximum engine speed $S_{max}$ from the allowable range d is determined; the viscosity of the ER fluid 37 which eliminates the maximum engine speed deviation is determined; the voltage V which provides the determined viscosity is determined as an initial voltage during idling; and a deviation $\Delta V$ of the voltage applied to the flywheel is determined under consideration of the ER fluid viscosity characteristics. Further, the deviation voltage $\Delta V$ is increased immediately when the CPU detects that the maximum engine $S_{max}$ exceeds the allowable range d. The CPU outputs a command (voltage control) signal determined on the basis of the calculated magnitude and timing to the power supply 51 (in step S12), therefore a voltage corresponding to the command signal is applied to the electrodes 33 to 36 to change the viscosity of the ER fluid 37 as shown in FIG. 16, in which the voltage is increased by $\Delta V$ at $t = t_1$. Further, the same command signals determined between the steps $P_6$ and $P_{11}$ can be outputted repeatedly within a predetermined time period (e.g. several minutes), because the fuel combustion pressure of a diesel engine is substantially uniform in time sequence of cylinders. However, the data sampling operation of the throttle opening rate sensor 52a, the top dead point pulse sensor 52b and the engine speed pulse sensor 52c is effected at all times. Further, the supply voltage determined on the basis of the command signal is always applied to the ER fluid 37. As described above, in the flywheel according to the present invention, since the inertial mass of the flywheel can be varied according to engine speed fluctuations; that is, since the inertial mass of the flywheel is increased when the engine is operating at low speed (e.g. during idling), it is possible to absorb torque ripple for providing stable engine running. Further, since the inertial mass thereof is decreased when the engine is operating at high speed (e.g. during acceleration), it is possible to maintain high engine torque response characteristics. In addition, since the two opposing areas between the electrodes 33 and 34 or 35 and 36 in contact with the ER fluid 37 are relatively large and the distance between the electrodes 33 and 34 or 35 and 36 is short, it is possible to increase the intensity and the sensibility of the electric field applied to the ER fluid 37, thus allowing the maximum effect by a small amount of the ER fluid 37.

Here, the ER (electrorheological) fluid will be described in further detail hereinbelow.

The ER fluid is a special fluid whose viscosity increases in proportion to the intensity of electric field applied to the fluid. That is, when the fluid is placed within a non-electric field, the viscosity is low. However, when placed within an electric field, the viscosity increases up to a solidified status. The above reaction is reversible and the reaction speed is as high as several milliseconds.

The above-mentioned phenomenon was found by W. Winslow in 1947. That is, when an electric field of 4 KV/mm is applied to a solvent obtained by dispersing silica gel or starch particulates (dispersoid) with diameters from 1 to 100 $\mu$m in mineral oil, he found that the fluidity changed, so that the ER effect is called Winslow effect.

Figure 17A:
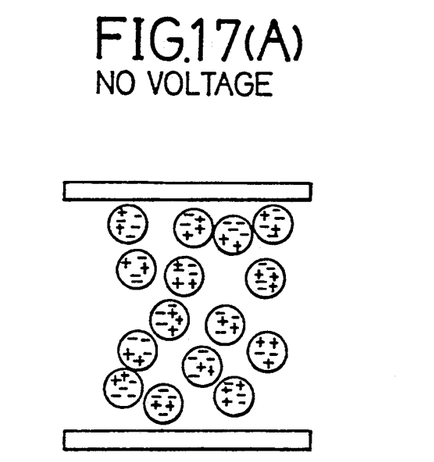
FIGS. 17(A), (B), (C) and (D) are diagrams for assistance in explaining the principle of change in viscosity of electrorheological fluid.
Figure 17B:
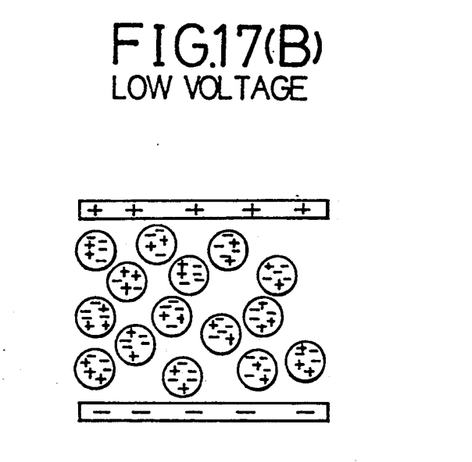
Figure 17C:
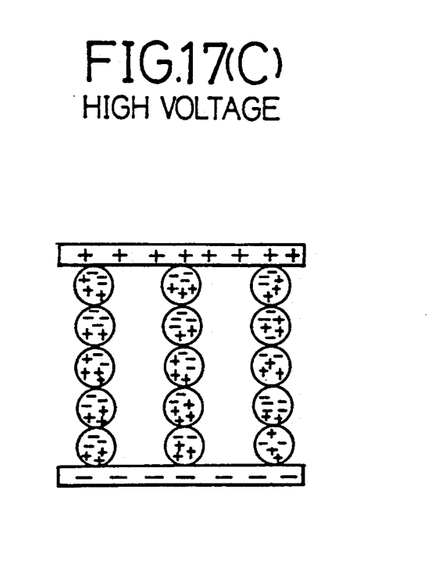
Figure 17D:
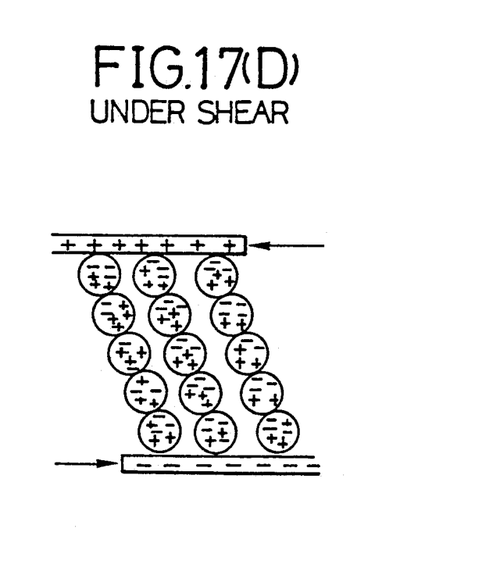

With reference to FIGS. 17(A), (B), (C) and (D), the mechanism of the ER effect will be explained hereinbelow. Assumption is made that the influences of current, electric charge motion, interfacial active agent, water, etc. are omitted. (1) When no electric field is applied as shown in FIG. 17(A), although the ER fluid includes dispersoid particulates having small amounts of positive and negative charges, the ER fluid is neutralized on the whole. (2) When a low voltage is applied between two electrodes as shown in FIG. 17(B), positive electric charges in particulates move toward the negative electrode and negative electric charges in particulates move toward the positive electrode. (3) When a high voltage is applied between the two electrodes as shown in FIG. 17(C), the particulates are connected in chain fashion in dependence upon attraction forces generated between positive and negative charges. In practice, the particulates move in several milliseconds from the state shown in FIG. 17(B) to that shown in 17(C). (4) When a shearing force is applied to the ER fluid by applying an electric field thereto as shown in FIG. 17(D), since attraction forces due to electric charges are generated between particulates, shearing resistance occurs and therefore the viscosity increases. When the electric field is removed from the ER fluid, since particulates are not charged, the fluid viscosity decreases to the original liquid state. Further, once the particulate chain is broken by a large shearing force, the particulates are attracted again by the charge attractive forces.

Figure 18A:
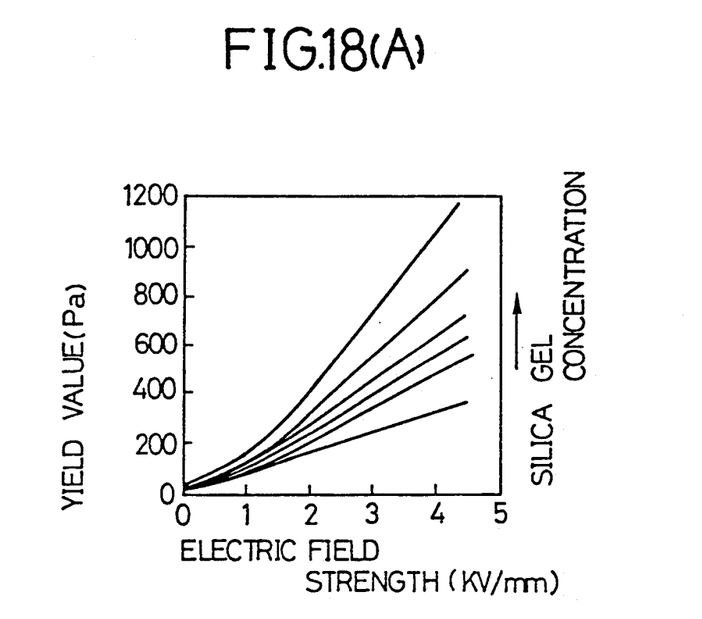
FIG. 18(A) is a graphical representation showing the relationship the yield value and the electric field strength of a of ER fluid.
Figure 18B:
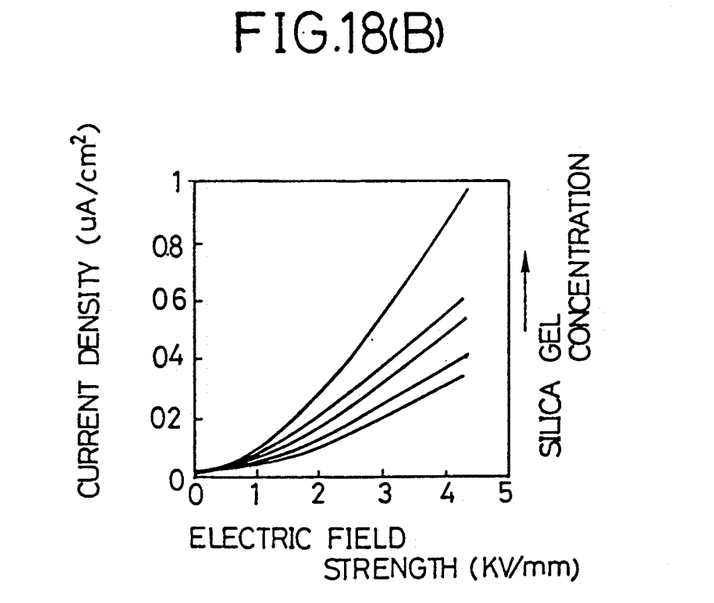
FIG. 18(B) is a graphical representation showing the relationship between the current density and the electric field strength of an example of ER fluid.

In the initial ER fluid, since water is added, the energy consumption rate was high. Recently, however, ceramics dispersoid has been added to high molecular compounds. FIGS. 18(A) and (B) show the relationship between the field intensity (KV/mm) and the yield value (Pa), the current density ($\mu$A/cm$^2$) obtained when silica gel dispersoid is dispersed in a high molecular compound, where the yield value indicates a upper shearing force limit at which a solid state charges to a liquid state and the current density ($\mu$A/cm$^2$) indicates a current value passed through a unit area. FIGS. 18(A) and (B) indicate that the concentration of the dispersoid exerts influences upon not only the ER fluid viscosity but also the yield value and the current density. Further, the currently used dispersion medium is silicon oil, mineral oil, paraffin chloride, diphenyl chloride, etc. and the dispersoid is microcrystalline cellulose, ion-exchange resin (stylene-divinylbenzene polymer), etc.

Further, U.S. Pat. Nos. 2886151 and 3047507 disclose the ER fluid, and German Patent (P-3336965.8) (Japanese Published Unexamined (Kokai) Patent Appli. No. 60-104828) discloses an engine supporting body using ER fluid. These Patent Documents are incorporated herein by reference.

The flywheel according to the present invention has been applied to reduce the half-degree diesel engine vibration. Without being limited thereto, however, it is also possible to reduce various engine vibration (e.g. low frequency (baffle) idling or rumbling sound) caused by engine speed fluctuations by modifying sensor signals applied to the controller 53 in order to control voltages to be applied to the ER fluid 37.

As described above, in the variable inertial mass flywheel according to the present invention, since an ER fluid whose viscosity changes quickly according to change in electric field intensity is disposed between the main flywheel member connected to an engine crankshaft and the subflywheel member movable relative to the main flywheel member, it is possible to quickly change the inertial mass of the flywheel according to engine speed fluctuations, thus providing a variable inertial mass flywheel which can effectively absorb torque ripple at idling and can stably provide high engine torque response characteristics at engine acceleration.

What is claimed is:
1. A variable inertial mass flywheel connected to an engine via an engine output shaft, which comprises:
 (a) a main flywheel member connected to the engine output shaft and rotatable therewith;
 (b) a subflywheel member disposed opposingly to said main flywheel member and rotatable relative to said main flywheel member;
 (c) at least one pair of electrodes formed on both opposing surfaces of said main flywheel member and said subflywheel member;
 (d) a power supply controller, connected to said electrodes, for controllably generating an electric field between said electrodes formed on said main flywheel member and said subflywheel member; and
 (e) a fluid disposed between said electrodes, a viscosity of said fluid being varied according to the intensity of the electric field generated between said electrodes to controllably couple or decouple said subflywheel member to or from said main flywheel member via said fluid.

2. The variable inertial mass flywheel of claim 1, wherein said power supply controller is connected to said electrodes via a slip ring mechanism which comprises:
 (a) a first annular rail-shaped conductor arranged on an outer surface of said main flywheel member and connected to an electrode formed on said main flywheel member;
 (b) a second annular rail-shaped conductor arranged on an outer surface of said main flywheel member concentrically with said first annular rail-shaped conductor;
 (c) a third annular rail-shaped conductor arranged on an outer surface of said subflywheel member concentrically with said first and second conductors and connected to said electrode formed on said subflywheel member;
 (d) first and second rod-shaped conductors slidably in contact with said first and second annular rail-shaped conductors and connected to said power supply; and
 (e) a third rod-shaped conductor slidably in contact with said third annular rail-shaped conductor and connected to said second rail-shaped conductor.

3. The variable inertial mass flywheel of claim 1, wherein said fluid is an electrorheological fluid.

4. The variable inertial mass flywheel of claim 1, wherein the electric field generated between said electrodes is controlled according to engine speed.

5. The variable inertial mass flywheel of claim 1, wherein a high electric field is generated at a low engine speed and a low electric field is generated at high engine speed.

* * * * *